United States Patent
Murphree

[11] Patent Number: 6,145,465
[45] Date of Patent: Nov. 14, 2000

[54] FOLDABLE CAMPER/BOAT/TRAILER SYSTEM AND METHOD

[76] Inventor: Terry Murphree, 420 Sioux La., Billings, Mont. 59105

[21] Appl. No.: 09/110,069

[22] Filed: Jul. 3, 1998

Related U.S. Application Data

[60] Provisional application No. 60/077,613, Mar. 10, 1998.

[51] Int. Cl.⁷ .................. B63B 8/00; B63B 7/00; B60P 3/071; B60R 15/00
[52] U.S. Cl. .................. 114/353; 114/343; 296/157; 280/414.1
[58] Field of Search .................. 114/352, 361, 114/353, 344, 77 R; 280/414.1; 296/157

[56] References Cited

U.S. PATENT DOCUMENTS

| | | | |
|---|---|---|---|
| D. 314,741 | 2/1991 | Loper | D12/300 |
| D. 320,779 | 10/1991 | Wheeler | D12/300 |
| D. 356,773 | 3/1995 | Lange | D12/300 |
| 3,594,834 | 7/1971 | Steensen | 9/2 |
| 3,955,228 | 5/1976 | Gaschenko et al. | 9/1 B |
| 3,972,544 | 8/1976 | Soot | 280/704 |
| 4,133,577 | 1/1979 | Pilant | 296/23 B |
| 4,170,242 | 10/1979 | Caso | 135/5 C |
| 4,180,881 | 1/1980 | Speranza | 9/2 F |
| 4,290,157 | 9/1981 | Jensen, Jr. | 9/2 C |
| 4,362,519 | 12/1982 | Gault | 114/353 |
| 4,522,143 | 6/1985 | Holzbaur | 114/344 |
| 4,554,884 | 11/1985 | Bouliane | 114/344 |
| 4,597,355 | 7/1986 | Kirby | 114/345 |
| 4,597,402 | 7/1986 | Morris, Jr. | 135/102 |
| 4,664,401 | 5/1987 | Carrick | 280/414.1 |
| 4,671,202 | 6/1987 | Johnson | 114/353 |
| 4,751,889 | 6/1988 | Pool | 114/39.1 |
| 4,781,143 | 11/1988 | Logan | 114/353 |
| 4,802,685 | 2/1989 | Godbersen | 280/414.1 |
| 4,827,865 | 5/1989 | Yelderman | 114/353 |
| 4,841,899 | 6/1989 | Fleckles et al. | 114/347 |
| 4,869,194 | 9/1989 | Cummins | 114/344 |
| 4,961,397 | 10/1990 | Trone | 114/347 |
| 5,176,394 | 1/1993 | Veazey | 280/414.1 |
| 5,183,002 | 2/1993 | Parker | 114/353 |
| 5,261,346 | 11/1993 | Updyke | 114/352 |
| 5,303,667 | 4/1994 | Zirkelbach et al. | 114/361 |
| 5,353,733 | 10/1994 | Evans | 114/353 |
| 5,477,804 | 12/1995 | Chan | 114/354 |
| 5,481,999 | 1/1996 | Clark | 114/361 |
| 5,499,594 | 3/1996 | Bullock | 114/354 |
| 5,515,805 | 5/1996 | Johanson | 114/344 |
| 5,544,944 | 8/1996 | Keech | 298/5 |
| 5,615,634 | 4/1997 | Gonda | 114/354 |
| 5,624,129 | 4/1997 | Clark, Jr. | 280/478.1 |
| 5,642,686 | 7/1997 | Jeswine | 114/354 |
| 5,651,706 | 7/1997 | Kasper | 440/29 |
| 5,660,137 | 8/1997 | Manley | 114/361 |

OTHER PUBLICATIONS

Folbot Folding Kayaks—Advertisement and Internet Information.

*Primary Examiner*—S. Joseph Morano
*Assistant Examiner*—Patrick Craig Muldoon
*Attorney, Agent, or Firm*—Santangelo Law Offices, P.C.

[57] ABSTRACT

A combination foldable camper/boat/trailer system features flexibility, ease of storage, and ease of assembly. The boat may be tapered so that it forms a more stabilized surface in the water and can prevent inadvertent collapse of the shells from an open position (designated self stabilizing). For additional security, the boat may include a securing element, such as a U-shaped securing element which may span the ends of the shells which abut each other so that the integrity of the water resistant shells is not impaired, a flexible weather resistant covering such as a tent mounted over the boat for use as a camper, may be collapsible and can be stored inside the shells when for instance the shell are in a folded position. The tent may be self-erecting upon opening the shells to an open position, such that it requires minimal effort to position any tent frames and attach the tent to the shells or the shells may be used as a top of the camper, and can be used in conjunction with a specialized trailer which may include extendable or telescoping supports. These supports may support the shells in an open position and may assist in using for instance the shells as a camper mounted on the trailer. The system thus offers a combination camper, boat, hauler, and storage device which may be folded for ease of storage and transportation.

24 Claims, 7 Drawing Sheets

FOLDABLE CAMPER/BOAT/TRAILER SYSTEM AND METHOD

This application claims the benefit of application Ser. No. 60/077,613 filed on Mar. 10, 1998.

The contents of that application are hereby incorporated by reference.

This invention relates to recreational devices. Specifically, it relates to a combination folding system that may be used as a camper or a boat in conjunction with a specialized trailer for storage, camping, boating and hauling.

I. BACKGROUND OF THE INVENTION

For several decades, those in boating have desired a small, compact boat that can be easily hauled to various locations, unfolded, and launched, and yet still provide sufficient support and security in the water. Such combinations include a "folding boat and trailer" to Johanson U.S. Pat. No. 5,515,805, a "folding boat construction and means for mounting same to a carrier" to Johnson U.S. Pat. No. 4,671,202, and a "folding boat with a detachable land wheels" to Evans, U.S. Pat. No. 5,353,733. While those have approached the ideals and goals of the present invention, they have still fallen short in providing a suitable answer to the need. Especially desirable has been the additional utility of providing a multi-purpose devise suitable for camping, boating, and a variety of uses. The present invention goes beyond those mentioned above and others and provides a unique combination that can be used for multiple purposes and yet function very suitably as well described below. Perhaps part of the reason that a suitable answer has not been widely used in the marketplace is because of the lack of fully functional characteristics found in these alternative designs as disclosed in prior patents. The present invention offers that combination and as of the filing of the application for this patent, has orders for several thousand units. Even those involved in the manufacturing of this design have expressed surprise at the uniqueness and simplicity of the various features that may combine for a unique and satisfactory blending of the various purposes for which the invention is designed.

Part of the motivation for designing such a system is the desire by many owners of boats to be able to store the boat in a typical home garage between the various items already present in the garage. While in many instances, a fully extended typical boat may take up an entire bay of the garage, foldable boats easily can be slipped into at least half the space. In some instances, boat owners have to take a double car garage and park the boat diagonally such that two bays are taken up leaving little space for other items to be stored. With the present invention, a much more efficient use of the space may be made, including, for instance, folding the boat and the trailer in a vertical position for very compact storage. Yet, in an unfolded condition, the boat may be a full size fishing boat suitable for a variety of uses in fresh water and salt water. Another motivation for a folding boat of this design is that it may store a variety of items either loose or in packages under cover between the two shells, as will be described below. Normally, a separate, enclosed trailer would be needed. Still further, such a design may be used in an open manner to haul larger items. Thus, such a device as the present invention may offer a large amount of utility in a little amount of space.

One of the difficulties to date with any of these other designs, which the present invention answers, is one of stability. The common fear, and perhaps with some justification, is that the boat may collapse, fold in the middle, and sink the occupants and contents. However, the present invention offers a unique structure that significantly reduces or eliminates this risk.

The other problem that has gone unanswered satisfactorily by many is the awkwardness or perhaps difficulty in which the two halves are secured together. For instance, a typical answer might be one such as shown in Johnson '202 where the two halves are simply held together by a bolt and nut arrangement. Naturally, this can be effective at holding, but it may require time, effort, perhaps tools, and in salt water the items may corrode, lending even more difficulty to removal and installation.

In short, even though the idea of a folding boat has been known for quite some time, the combination of useable elements that would be desired and produce a commercially viable invention simply has not been realized prior to the present invention. As mentioned above, those with ordinary skill in the art have expressed surprise when seeing the unique combination of features or even individual features that offer perhaps for the first time, a truly viable folding boat in combination with its other purposes such as camping, transportation, and storage. Indeed, there has been a long felt but unsatisfied need for the invention while the needing implementing arts and elements have long been available. It simply took a proper perspective to solve the long felt need. Those with ordinary skill in the art certainly appreciated that the problem existed, but just were unsure how to solve it. As mentioned above, many others made substantial attempts to fill the need but were unable, prior to the present invention, to understand how to first, solve the problem, and second, how to provide a combination of features that would meet the needs described above. Furthermore, the commercial success of the invention already, as early as even the date of filing this application, shows that those in the art recognize the uniqueness of this invention. Those with ordinary skill in the art have expressed some disbelief and incredulity that such an arrangement could offer the stability that this arrangement offers. For instance, a test has been performed on this particular structure where approximately 400 pounds has been loaded into each half for a total of 800 pounds and yet the boat has not folded or collapsed, even without a securing element. Naturally, such an unusually large amount of weight in the small structure is not recommended for use, but the test results show that the boat has a large amount of stability not heretofore realized.

II. SUMMARY OF THE INVENTION

Accordingly, the present invention provides a unique combination camper, boat, trailer system adapted for camping, boating, transportation and storage. The boat aspect includes a foldable boat that can be used for multiple purposes in combination with a unique trailer and a collapsible tent arrangement.

A goal with various objects of the present invention is to provide a foldable camper/boat/trailer system adapted for camping, boating, transportation and storage having a somewhat rigid first shell with two sides, a bottom, and a shell end which may be connected through a connecting member to a rigid second shell having a similar arrangement, so that when the first and second shell ends abut each other, a multipurpose boat, carrier, and camper may be formed. This arrangement may include a flexible weather resistant covering such as a tent that may surround the periphery of the boat when the boat is in an open position and may transform the boat into a camper.

This combination may be mounted temporarily or permanently on an extendable trailer such that the trailer may have extendable supports which extend when the shells are in an open position. Thus, the two shells in an open position may be supported by the trailer for storage, hauling, or camping such as in combination with the tent. While the boat offers a unique contour on the bottom that gives it the stability described above, for security there may be a receiving station or perhaps a pair of receiving stations, each typically including a first receiver and a second receiver which may be secured by a securing element together to further decrease the risk of inadvertent folding of the shells. Such a securing element may be a U-shaped member that may span each end and secure over each end so that the sides of the shells or ends of the shells need not be punctured and thus increase the risk of leakage. The bottom of the shells may offer a taper which tapers a substantial length of the bottom away from the ends which abut each other. The substantial length may be at least approximately two-thirds of the length of the boat. Thus, the bottom of the boat may offer a somewhat continuous convex shape. This shape on both ends, which is atypical of boat design, is one of the features which gives the boat stability. Furthermore, the tent described above may be adapted to collapse upon folding the shells together so that it may be stored inside the folded shells. The tent may also substantially self-erect when the shelves are folded out such that the unit requires little effort for suitable placement of the tent over the open shells. Naturally, further goals and objects of the invention are disclosed throughout other areas of the specification and claims.

IV. DETAILED DESCRIPTION OF THE PREFERRED EMBODIMENT

As mentioned earlier, the present invention includes a variety of components that may be used in different combinations, depending on the application that needs to be addressed. The invention is designed primarily to take advantage of a combination camper/boat/trailer system which is foldable of a particular and novel design and combine and modify it as needed for a variety of shapes, sizes, and orientations, as will be explained in more detail as the figures are described. Elements, functions, and procedures that distinguish the present invention will be noted where appropriate.

As can be easily understood, the basic concepts of the present invention may be embodied in a variety of ways. It involves both methods and devices to accomplish the appropriate method. In this patent, the methods are disclosed as part of the results shown to be achieved by the various devices described and as steps that are inherent to utilization. They are simply the natural result of utilizing the devices as intended and described. In addition, while some devices are disclosed, it would be understood that these not only accomplish certain methods, but also can be varied in many ways. Importantly, as to the foregoing, all these facets should be understood to be encompassed by this disclosure.

Figure 1:
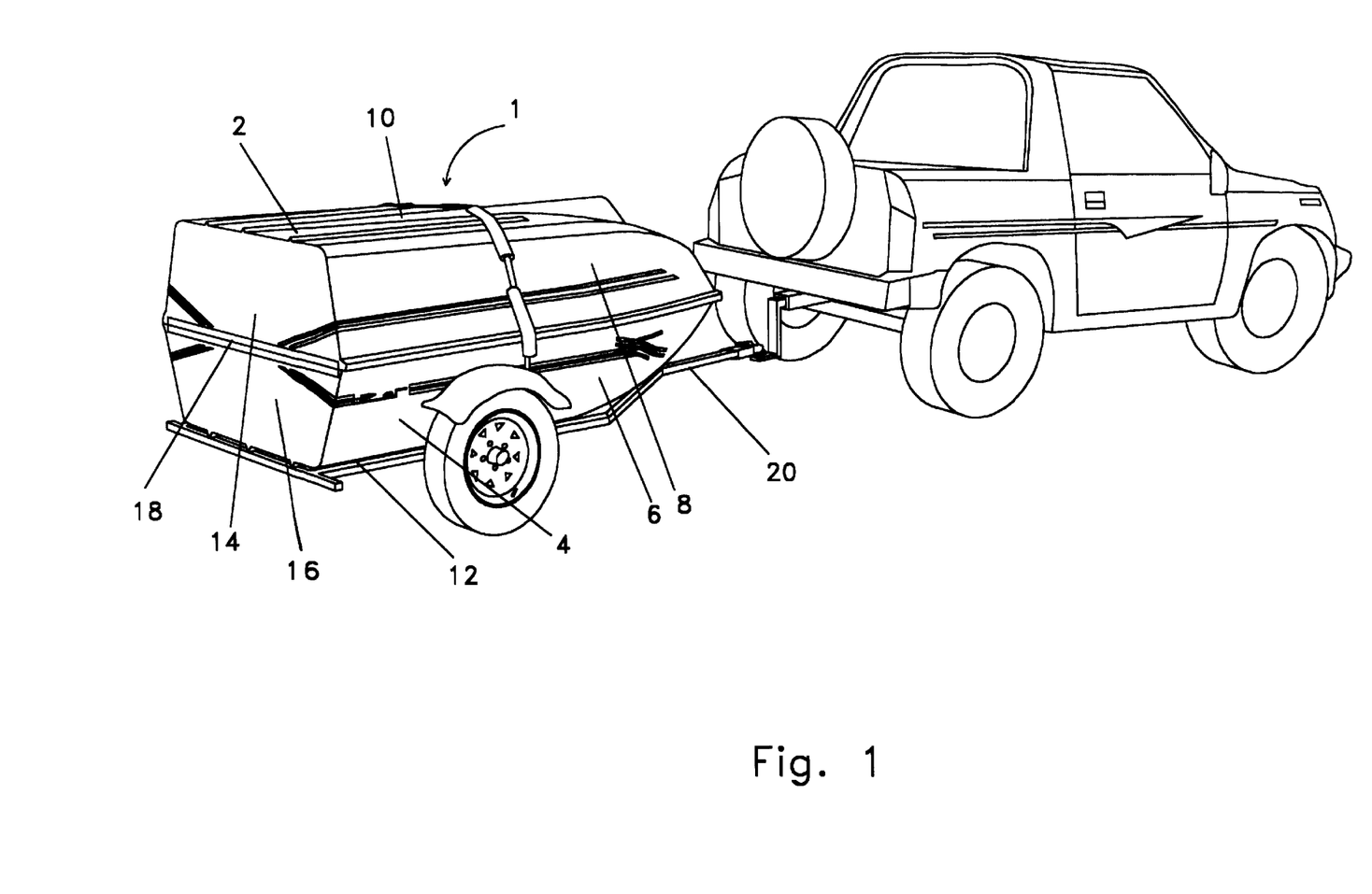
FIG. 1 shows the foldable camper/boat/trailer system in a folded position and attached to a vehicle for towing.

FIG. 1 shows the overall system in a folded condition. Its length can vary depending upon the application needed. Typically, the boat could be eight to ten feet long in a folded condition and approximately double that length in an open position. The camper/boat/trailer system (1) may include a first shell (2) and a second shell (4). Each shell may be rigid and for the purpose intended will most likely be water resistant, if not water proof. Each shell may have sides (6) and (8) and bottoms (10) and (12). In the preferred embodiment, the shells may be connected by connecting member (18) such as a hinge or some other pivoting element. Naturally, other connecting members could used and in some cases a connecting member may not be actuated until the parts are assembled such as a removable pin assembly. However, in the preferred embodiment, the connecting member may be a hinge assembly such that the first shell (2) may be folded open and the first shell end (14) abuts the second shell end (16) in the open position. The term "abut" or "abutting" may include, in the preferred embodiment, a touching in this case of the first shell end with the second shell end. However, it is not intended to be so limited. It may include simply locating the ends or other pieces in proximity to each other such that the goals and objects of the present invention are realized. As shown, the system may include the trailer (20). The trailer (20) will be described in more detail below.

Figure 2:
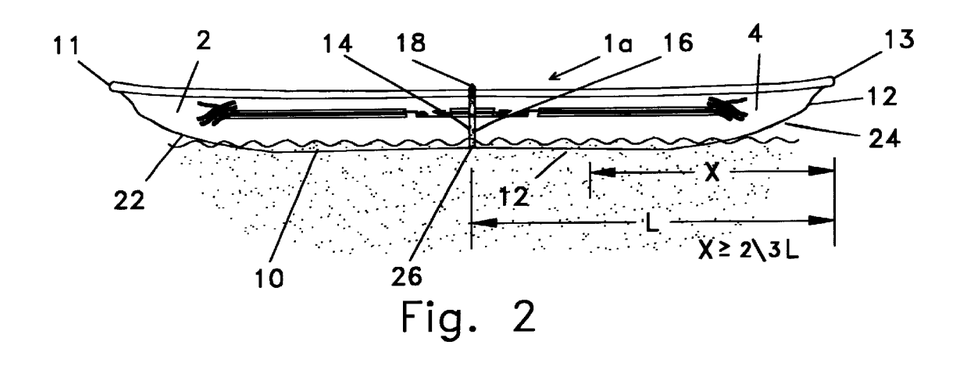
FIG. 2 shows a side view of the boat in an open position showing the taper on each shell which gives the boat stability.

FIG. 2 shows a side view of the boat (1a) having a tapered bottom. In the open position, the first shell (2) and the second shell (4) have been arranged so that the first shell end (14) and the second shell end (16) abut each other at the abutment point (26). The first shell bottom (10) has a taper (22) and may be similar to the second shell bottom (12) having a taper (24). The taper may be a continuous taper from the abutment point (26) to the distal ends (11) and (13) of the shells. In the preferred embodiment, the taper may start at least a distance of X from the distal end (in the preferred embodiment, at least two-thirds of the length L) of the shell and may continue to the distal end or at least a point above the intended water line of the boat.

This taper is one of the unique features of the present invention. Until this aspect was included, those with ordinary skill in the art did not realize the stability that the present invention and system provides. Because the buoyancy factor is affected by the depth of the boat, the lower the boat is in the water, the higher buoyancy it may have. Thus, by including a taper, the natural pressure exerted by the buoyancy of the water or other fluids in which the boat is placed exerts a higher pressure toward the center than toward the distal end away from the abutment point (26). This higher pressure helps maintain automatically and perhaps without even the necessity of further securing of the two shells, the stability of the boat and the inadvertent collapse of the boat. Thus, users may feel much safer in such an arrangement. As mentioned above, a test result on this shape using approximately 400 pounds on either side of the abutment point (26) for a total of 800 pounds, did not cause a collapse or inadvertent folding of the shells. While such a large weight may not be recommended in actual use, the test results show the inherent stability of this design not heretofore realized.

Figure 3:
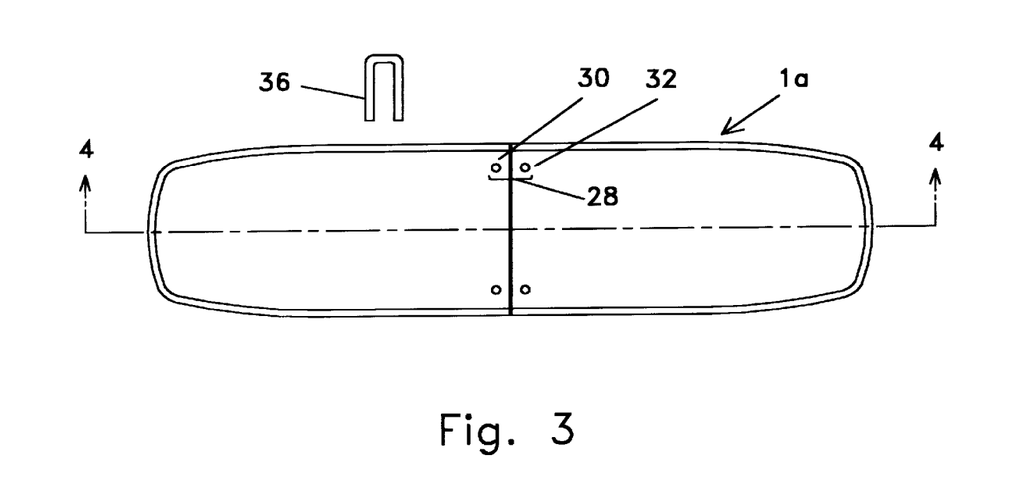
FIG. 3 shows a top view of the boat showing the receiver station.

FIG. 3 shows a top view of the boat (1a) in an open position. Details such as seats (which may be removable), outboard motor mounts, and so forth are not shown, but may be included as the marketplace and manufacturing concerns dictate. Attention is drawn to the receiver station (28). The inherent stability of the boat may exist as described above; however, it may be desirable to include an additional element of security. While other securing devices have been used in other inventions, the uniqueness of the present system's securing element allows for easy disassembly, typically requires no tools, and breaches no water-tight surfaces. Other systems might include a flanged assembly that could be bolted together requiring tools and the possibility of rusting and difficulty of removal or insertion. The present invention avoids those difficulties. The present invention may include a receiver station (28) which may be formed from a pair of receivers (30) and (32). In the preferred embodiment, a pair of receiver stations (28) may be useful, although in some embodiments one or more may be used. Each receiver may be a female or a male. In the preferred embodiment, the receivers may be a female arrangement such as a pipe or other elongated hollow member. This receiver may be mounted to the inside of the first and second shell ends or may be mounted at some other appropriate location. Naturally, the receivers could include other designs such as a male pin, or one receiver could be male and the other receiver female, and so forth.

Figure 4:
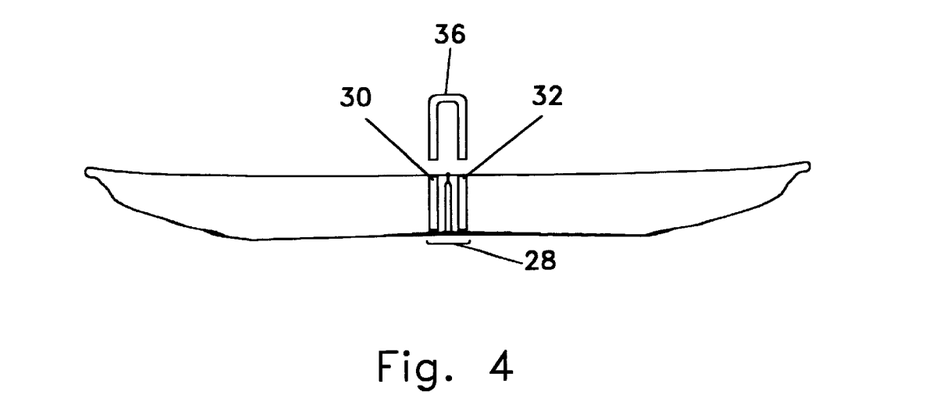
FIG. 4 shows a cross section of FIG. 3 showing more details of the receiver station, the receivers, and a securing element, such as a U-shaped member.

FIG. 4 is a cross section of FIG. 3 and shows the securing element (36) above the receiver station (28) in a position to engage the receivers (30) and (32). In the preferred embodiment, the securing element (36) may be a U-shaped member and may be a male pin, if for instance, the receiver were female. As discussed above, variations in the securing element and particularly the U-shaped member, may be made depending upon the particular configuration of the receivers (30) and (32). A "U-shaped" member is meant in a functional sense and would include a variety of shapes such a V's, three-sided rectangular shapes, shapes with bent legs, and so forth, as any of these could function to span the ends of the shells (typically inside the perimeter of the boat) without breaching the water integrity. Another advantage is that the U-shaped member may simply be inserted over each end in a easy and rapid manner. Such an insertion typically would include no need for tools or assembly under water, such as a flange (typically outside the perimeter of the boat) with a bolt and screw and other arrangements.

Figure 5:
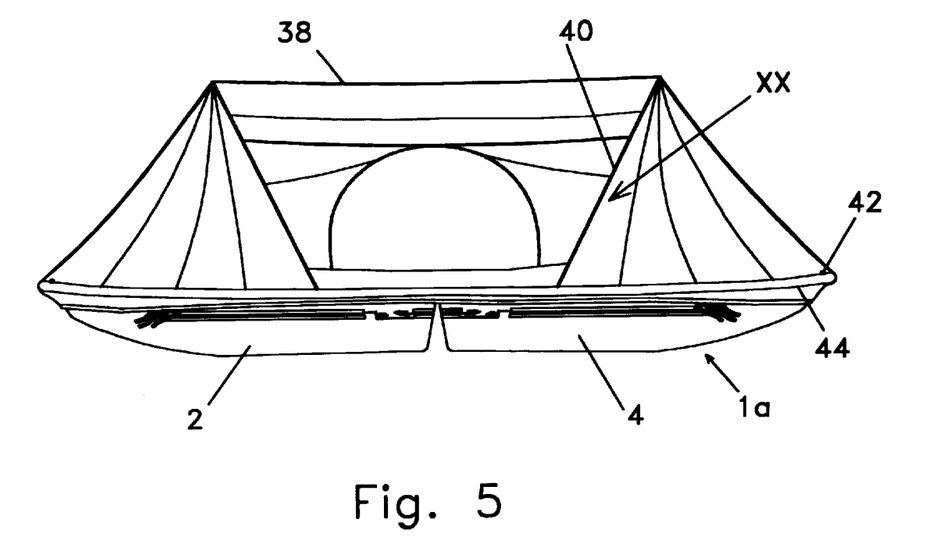
FIG. 5 shows an erected flexible weather resistant covering, such as a tent, over the shells in an open position.

FIG. 5 shows the boat (1a) with the first shell (2) and second shell (4) in an open position where the boat (1a) may be used as a camper by having a flexible weather resistant covering (38), such as a tent, over the boat (1a). The weather resistant covering may be a simple arrangement having a canvas, vinyl, or other material. It may be suspended by a tent frame (40) such as U-shaped bows. The tent frame may be connected to the shells by some element such as a hole or other type of attachment. The flexible weather resistant covering (38) may surround the periphery (44) of the shells in an open position. Such an envelope might be advantageous for insect resistance and further rainproofing. The flexible weather covering (38) could be attached at attachment points (42) located around the periphery or at other points on the shells.

Figure 6:
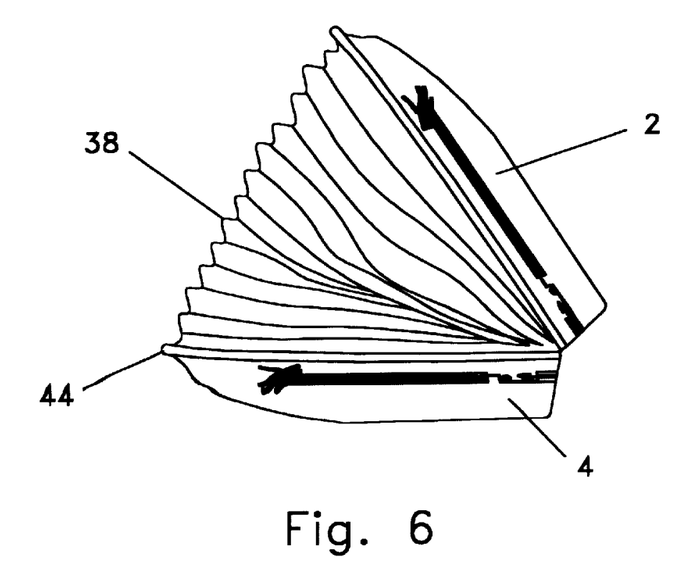
FIG. 6 shows the tent collapsing within the shells as the shells are folded to a folded position.

FIG. 6 shows the shells in a folding position with the first shell (2) being folded on top of the second shell (4). The flexible weather resistant covering (38) may collapse within the shells in a folding position for easy storage. Naturally, some minimal disassembly may be envisioned such as detaching the flexible weather resistant covering from around the periphery prior to folding the shells. Also, the tent frame (40) may need detaching from its attachment points. Such minimal assembly does not preclude the use of the term "collapsing within" nor does it preclude the term "self-erecting" when the shells are folded open. The reverse procedure is envisioned as a self-erecting tent procedure. When the shells are folded to an open position, the self-erecting tent could be folded outward as the shells are folded to an open position such that only minimal assembly might be required, such as simply placing the tent frame in its attachment points and securing the tent about the periphery (44) of the shells.

Figure 7:
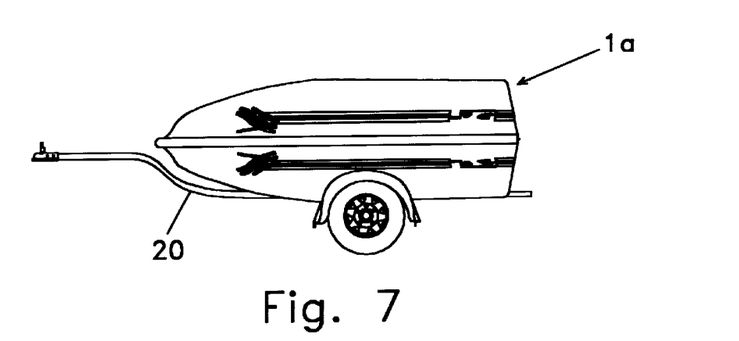
FIG. 7 shows the shells in a completely folded position located on a trailer.

FIG. 7 shows the camper/boat/trailer system where the boat (1a) is in a folded position on the trailer (20), similar to FIG. 1. In such a position, the system can be easily transported.

Figure 8:
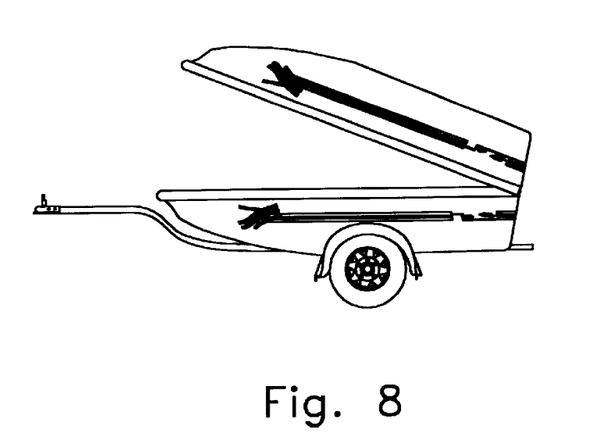
FIG. 8 shows the shells partially open, located on a trailer.

FIG. 8 shows the shells in a partially open position. In such an assembly, the shells may be used to store items, such as on a camping trip, and secure the items from becoming lost on the road as the system is transported.

Figure 9:
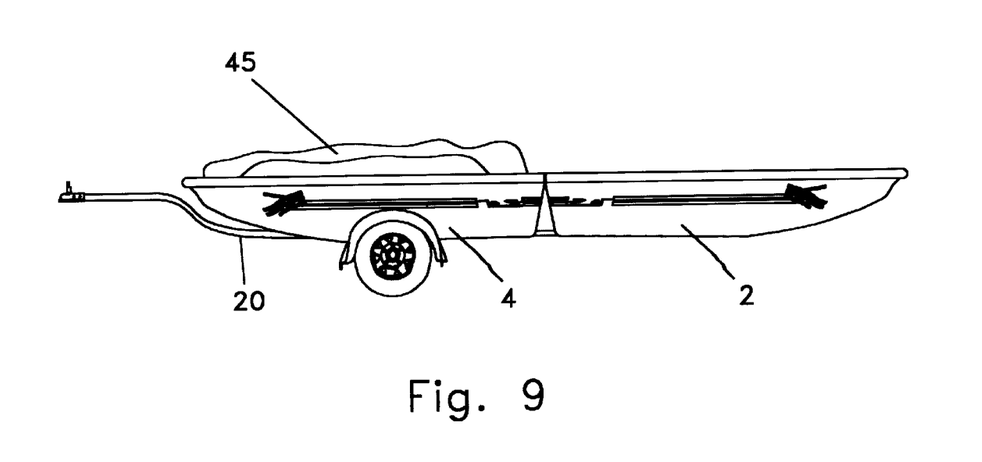
FIG. 9 shows the shells open, hauling a cargo.

FIG. 9 shows the shells in an open position. As shown, the first shell (2) has been opened and a load (45) of goods has been placed in the second shell (4) located on the trailer (20). After the load is placed in the second shell (4), the first shell (2) may be again folded back and secured to the second shell (4). Alternatively, it can simply be left in an open position, for instance, if the load is too large to close the shells back together.

Figure 10:
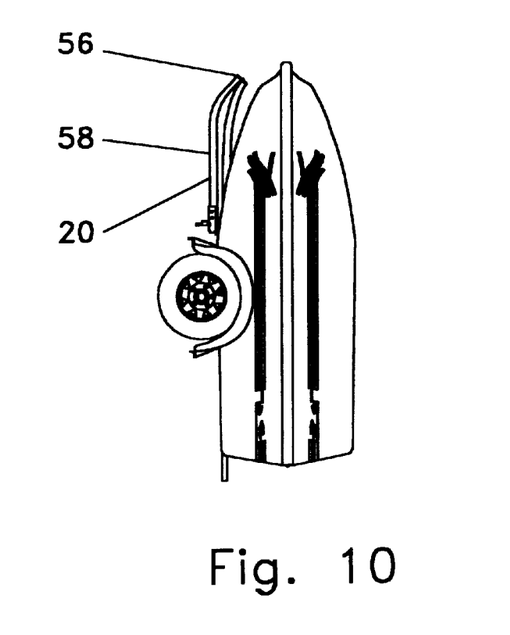
FIG. 10 shows the shells in an upright storage position with the tongue of the trailer having a reduced length such as by folding or removing.

FIG. 10 shows the camper/boat/trailer system in an upright position. This position could be ideal for storage, such as in or behind a garage or on the side of a house. Also note that the trailer (20) may also include a reduced length tongue (58). The reduced length tongue (58) may be reduced in length by at least two ways. The first way is to pivot the tongue about a pivot point (56) so that the tongue may be reduced in length and folded back against the trailer body. This might be advantageous for quick disassembly. Upon use, the tongue could simply be pivoted back into position and secured into position by a number of methods known to those with skill in the art, such as with a quick release pin arrangement. Alternatively, the tongue may be reduced in length by simply sliding the tongue out from the rest of the trailer frame assembly and stored nearby. Upon re-assembly, the tongue could be slid back in position and secured again, such as by some quick release pin assembly.

Figure 11:
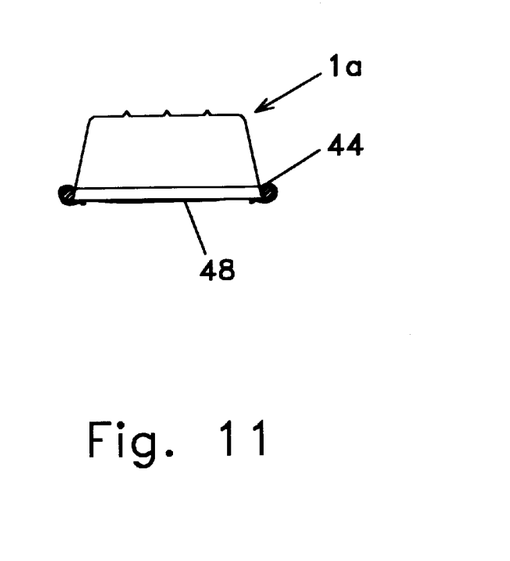
FIG. 11 shows yet another embodiment of a camping tent where the shells form the upper cover and a tent floor forms the bottom.
Figure 13:
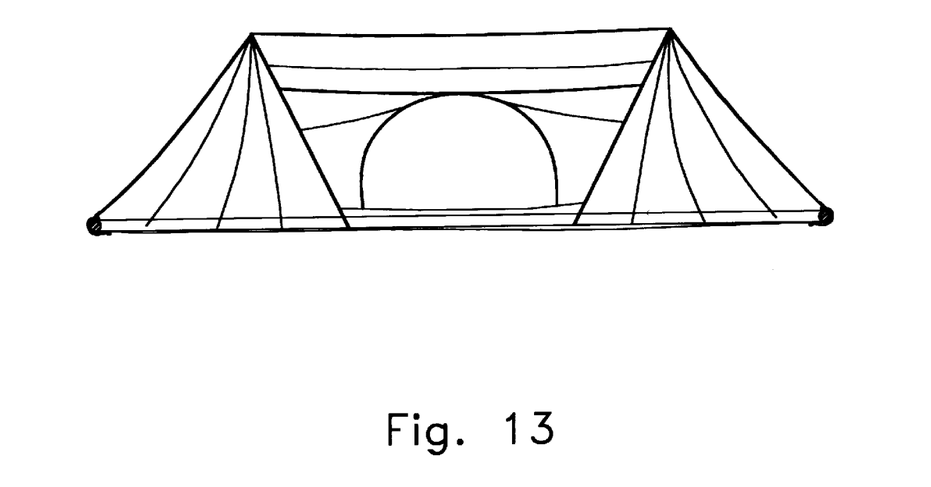
FIG. 13 shows a side view of a camping tent portion of one embodiment.

FIG. 11 shows an alternative to the camping tent arrangement of FIG. 5. In this position, the shell assembly may be used as the top and a tent floor (48), perhaps of the same material as the flexible weather resistant covering (38). As persons who camp understand, in certain situations, severe inclement weather may occur almost without notice. Such an arrangement could be easily transformed into a shelter to resist, for instance, hail and high winds. The tent floor (48) may again attach to the periphery (44) of the shells. Naturally, such an arrangement could include one or both of the shells. FIG. 13 shows a side view of a tent portion.

Figure 12:
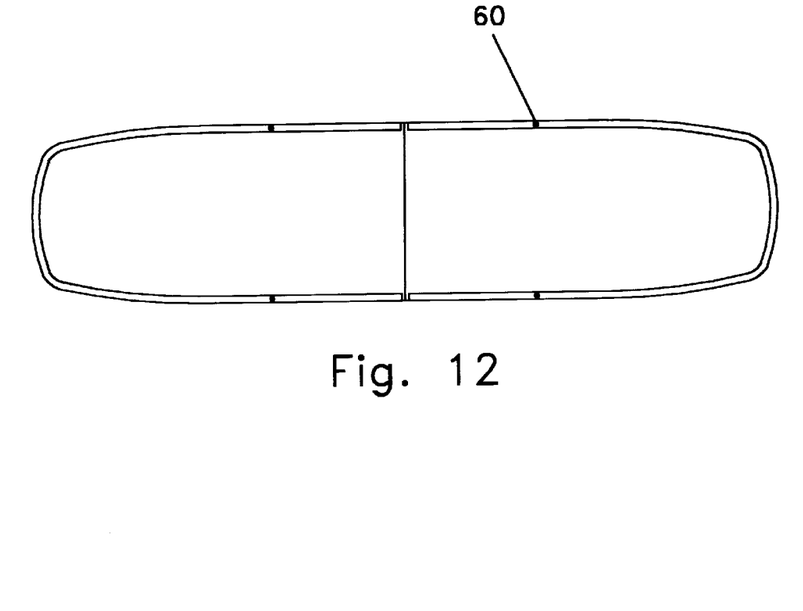
FIG. 12 shows a top view of the shells having attachment points for a tent framework.

FIG. 12 shows a top view of FIG. 5 without the weather resistant covering (38). In particular, it shows the attachment points (60) for the tent frame (40). Such attachment points could be simply a molded hole or pin to which the tent frame (40) could attach.

Figure 14:
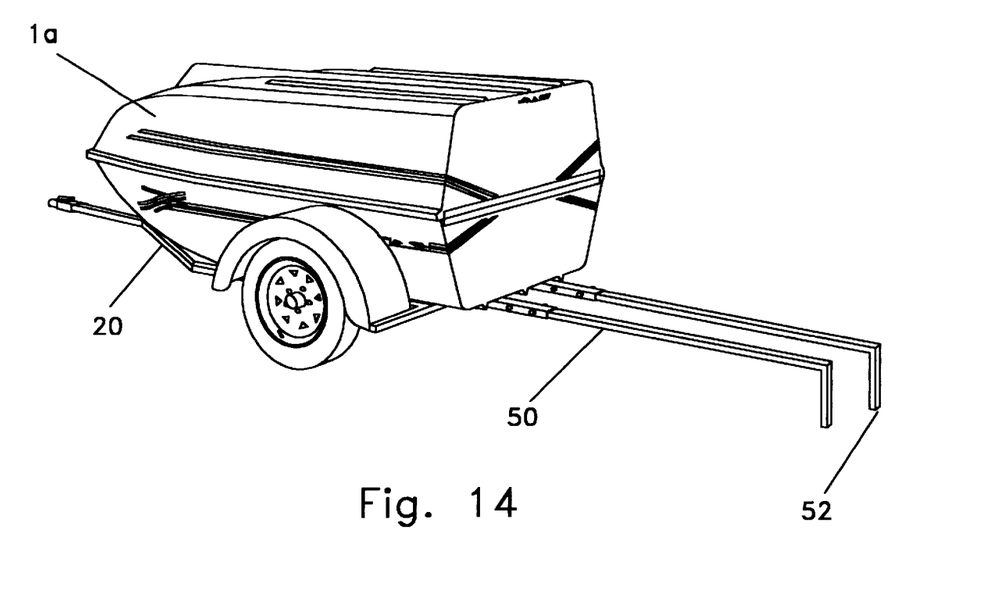
FIG. 14 shows the trailer with a pair of extendable supports extended outward and rotated downward to support the shells in an open position.
Figure 15:
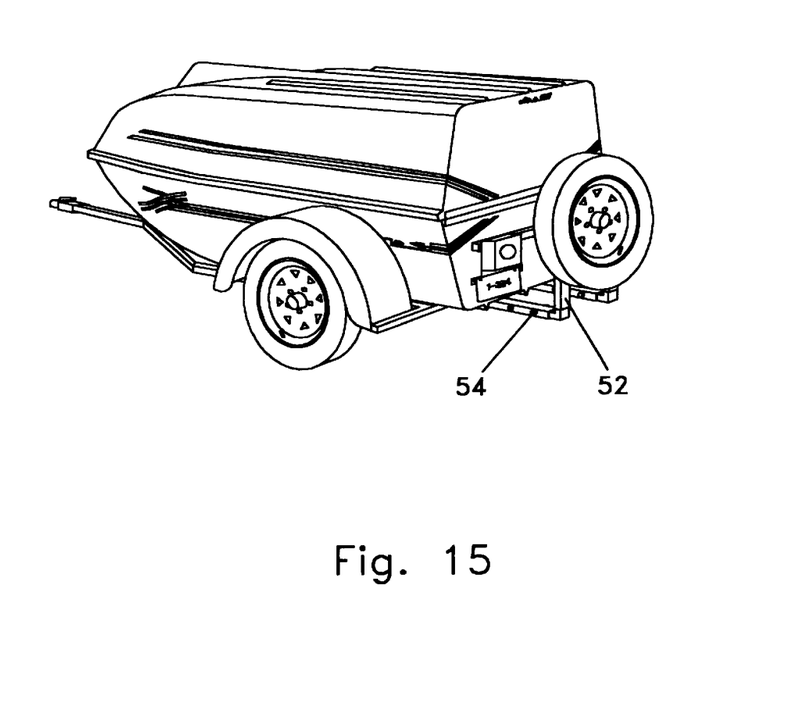
FIG. 15 shows the system with the extendable supports inward and rotated up and out of the way behind a spare tire carrier.

FIGS. 14–15 show the camper/boat/trailer system having at least one extendable support. One of the advantages of the system is that it can be easily pulled to a camping spot and quickly erected as a camper, even atop the trailer (20). In erecting such a system, additional support for the shells in an open position may be desirable as it is located on top of the trailer. The extendable support (50) shows one embodiment for this additional support. The extendable support (50) may be provided singly or in pairs, as shown in the preferred embodiment. The leg (52) of the extendable support (50) may be rotated to a downward position to contact a supporting surface such as the ground. The term "rotating" as used herein, such as on the extendable supports or upon the first shell rotating with respect to the second shell, is meant to include hingeably rotating as well as disassembling the part, orienting it toward the mating part, and then reassembly. These extendable supports may be arranged so that they telescope inward toward the primary trailer body. This aspect is shown in more detail in FIG. 14.

FIG. 14 shows the extendable support (50) telescoped inward and located underneath the trailer body in a storage position. The leg (52) has been rotated upward so that the system may be transported. The extendable support (50) may be secured to the frame body by a securing element (54) such as a quick release pin assembly. Also shown is a spare tire assembly which may be useful for road emergencies.

Another embodiment of the extendable support (50), not shown, may include a support that instead of telescoping, folds out from a retracted position to an extended position by a hinge joint, for instance. The support (50) can contact the supporting surface such as the ground as described above, perhaps in conjunction with a leg (52). Also, the extendable support may be used as a launching rail for launching the boat (1a) or a ramp for loading.

One of the advantages of this system is that it may be light weight. For instance, the system has been pulled on roads using a Honda Gold Wing motorcycle. Such a light weight system combined with flexibility, ease of assembly, stability, and multipurpose use has simply not appeared until the present invention. In a sense, each of these camper/boat/trailer system embodiments could include various facets of the present invention. Some may include the tent arrangement, while others may not include such arrangements. Some may include varieties of the extendable supports, the tapered bottoms, and the U-shaped securing elements. The marketplace and manufacturing concerns may dictate the appropriate embodiment for the present invention.

The foregoing discussion and the claims that follow describe only preferred embodiments of the present invention. Particularly with respect to the claims, it should be understood that a number of changes may be made without departing from the essence of the present invention. In this regard, it is intended that such changes—to the extent that they substantially achieve the same results in substantially the same way—will still fall within the scope of the present invention.

Although the methods related to the system were included in various detail, only initial claims directed toward the stabilizing tapers on the bottom have been included. Naturally, those claims could have some application in various other methods and apparatus claimed throughout the patent. Similarly, the disclosure of the system or method context is sufficient to support the full scope of method and apparatus claims with, for instance, the first and second shells, the tapered bottom, the connecting member, the camper arrangements in their various forms, the extendable supports, and other features described herein. While these may be added to explicitly include such details, the existing claims may be construed to include and encompass each of the other aspects. Without limitation, the present disclosure should be construed to encompass subclaims, some of which are presented in a system or method context as described above for each of the other general aspects. In addition, to the extent any revisions utilize the essence of the invention, each would naturally fall within the breadth of protection encompassed by this patent. This is particularly true for the present invention since its basic concepts and understandings may be broadly applied.

As mentioned earlier, this invention can be embodied in a variety of ways. In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, as an example, the disclosure of a "taper" should be understood to encompass disclosure of the act of "tapering"—whether explicitly discussed or not—and, conversely, were there only disclosure of the act of "tapering", such a disclosure should be understood to encompass disclosure of a "taper." Such changes and alternative terms are to be understood to be explicitly included in the description.

It is simply not practical to describe in the claims all the possible embodiments to the present invention which may be accomplished generally in keeping with the goals and objects of the present invention and this disclosure and which may include separately or collectively such aspects as tapering the bottom, extending the trailer supports, securing the shells together, and other aspects of the present invention. While these may be added to explicitly include such details, the existing claims should be construed to encompass such aspects. To the extent the methods claimed in the present invention are not further discussed, they are natural outgrowths of the system or apparatus claims. Therefore, separate and further discussion of the methods are deemed unnecessary as they otherwise claim steps that are implicit in the use and manufacture of the system or the apparatus claims. Furthermore, the steps are organized in a more logical fashion; however, other sequences can and do occur. Therefore, the method claims should not be construed to include only the order of the sequence and steps presented.

Furthermore, any references mentioned in the application for this patent as well as all references listed in any information disclosure originally filed with the application are hereby incorporated by reference. However, to the extent statements might be considered inconsistent with the patenting of this/these invention(s), such statements are expressly not to be considered as made by the applicant(s).

I claim:

1. A foldable camper/boat/trailer system adapted for camping, boating, transportation, and storage comprising:
   a. a rigid water resistant first shell having two sides, a first bottom and a first shell end;
   b. a rigid water resistant second shell having two sides, a second bottom and a second shell end;
   c. a connecting member attaching said first and second shell at said first and second shell end wherein said first and second shell end are adapted to abut each other;
   d. a securing element adapted to secure said first and second shell ends together;
   e. a flexible weather resistant covering connected to said first and second shell when said shells are in an open position; and
   f. an extendable trailer adapted to support said shells in an open position; and
   g. a receiving station comprising a first receiver connected to said first shell and a second receiver connected to second shell and a securing element adapted to secure said first and second shell ends in an abutting position wherein said receivers comprise an elongated hollow member and wherein said securing element comprises a U-shaped member adapted to span each end and engage a pair of said elongated hollow members.

2. A foldable camper/boat/trailer system as described in claim 1 wherein said extendable trailer comprises at least one extendable support extending under said boat and extendable to a length sufficient to support at least one of said shells in said open position.

3. A foldable camper/boat/trailer system as described in claim 2 wherein said extendable support is rotatable from a retracted storage position to an extended support position.

4. A foldable camper/boat/trailer system as described in claim 1 wherein said first bottom has a taper which tapers a substantial length of said bottom away from said first shell end and said second bottom as a taper which tapers a substantial length of said bottom away from said second shell end.

5. A foldable camper/boat/trailer system as described in claim 4 wherein each said tapers have a length of at least approximately two-thirds of the length of said bottoms.

6. A foldable camper/boat/trailer system as described in claim 1 wherein said flexible weather resistant covering comprises a tent connected to said boat.

7. A foldable camper/boat/trailer system as described in claim 6 wherein said tent comprises a removable tent surrounding both shells and restrained about a periphery of said shells.

8. A foldable camper/boat/trailer system as described in claim 6 wherein said tent is adapted to collapse within an interior of said shells when said shells are folded to a folded position.

9. A foldable camper/boat/trailer system as described in claim 8 wherein said tent comprises a self-erecting tent which is adapted to fold out when said shells are opened to an open position.

10. A foldable camper/boat/trailer system as described in claim 1 wherein said trailer comprises a reduceable length trailer tongue.

11. A foldable boat comprising:
    a. a rigid water resistant first shell having two sides, a first bottom and a first shell end;
    b. a rigid water resistant second shell having two sides, a second bottom and a second shell end;
    c. a connecting member attaching said first and second shell at said first and second shell end wherein said first and second shell end are adapted to abut each other;
    d. a securing element adapted to secure said first and second shell ends together;
    e. a flexible weather resistant covering attached to said first and second shell when said shells are in an open position;
    f. a receiving station comprising a first receiver connected to said first shell and second receiver connected to second shell; and
    g. a securing element adapted to secure said first and second shell ends in an abutting position wherein said receivers comprise an elongated hollow member and wherein said securing element comprises a U-shaped member adapted to span each end and engage a pair of said elongated hollow members.

12. The foldable boat as described in claim 11 wherein said first bottom has a taper which tapers a substantial length of said bottom away from said first shell end and said second bottom has a taper which tapers a substantial length of said bottom away from said second shell end.

13. The foldable boat as described in claim 12 wherein said tapers each have a length of at least approximately two-thirds of the length of said bottoms.

14. The foldable boat as described in claim 11 wherein said weather resistant covering comprises a tent connected to said boat.

15. The foldable boat as described in claim 14 wherein said tent comprises a self-erecting tent which is adapted to fold out when said shells are opened to an open position.

16. A self stabilizing foldable boat comprising:
    a. a rigid water resistant first shell having two sides, a first bottom and a first shell end wherein said first bottom has a taper which tapers a substantial length of said bottom away from said first shell end;
    b. a rigid water resistant second shell having two sides, a second bottom and a second shell end wherein said second bottom has a taper which tapers a substantial length of said bottom away from said second shell end;
    c. a connecting member attaching said first and second shell at said first and second shell end wherein said first and second shell end are adapted to abut each other and wherein said sides, ends, and said bottoms which taper away for their respective ends when abutting each other comprise a self stabilizing foldable boat; and
    d. a receiving station comprising a first receiver connected to said first shell and a second receiver connected to second shell and a securing element adapted to secure said first and second shell ends in an abutting position wherein said receivers comprise an elongated hollow member and wherein said securing element comprises a U-shaped member adapted to span each end and engage a pair of said elongated hollow members.

17. The self stabilizing foldable boat as described in claim 16 wherein said tapers each have a length of at least approximately two-thirds of the length of said bottoms.

18. The self stabilizing foldable boat as described in claim 16 wherein said receivers comprise a pin and wherein said securing element comprises a U-shaped member adapted to span each end and engage a pair of said pins.

19. The self stabilizing foldable boat as described in claim 16 further comprising a tent covering at least a portion of one of said shells.

20. The self stabilizing foldable boat as described in claim 19 wherein said tent comprises a removable tent adapted to surround both of said shells in an open position and said tent is restrained around the periphery of said shells.

21. The self stabilizing foldable boat as described in claim 19 wherein said tent is adapted to collapse within an interior of said shells when said shells are folded to a folded position.

22. The self stabilizing foldable boat as described in claim 21 wherein said tent comprises a self-erecting tent which is adapted to fold out when said shells are opened to an open position.

23. The self stabilizing foldable boat as described in claim 19 wherein said boat is adapted to be carried on a trailer and be removable from said trailer and wherein said trailer comprises at least one extendable support adapted to support said foldable boat in an open position with said tent on said trailer.

24. The self stabilizing foldable boat as described in claim 16 wherein said boat is adapted to be carried on a trailer and be removable from said trailer.

* * * * *